United States Patent [19]

Miyake et al.

[11] 4,202,860

[45] May 13, 1980

[54] CONTINUOUS SEPARATION OF URANIUM ISOTOPES

[75] Inventors: Tetsuya Miyake, Tokyo; Norito Ogawa, Yokohama; Motohisa Asano, Yokohama; Kazuo Okuyama, Yokohama, all of Japan

[73] Assignee: Asahi Kasei Kogyo Kabushiki Kaisha, Osaka, Japan

[21] Appl. No.: 799,891

[22] Filed: May 23, 1977

[30] Foreign Application Priority Data

May 28, 1976 [JP] Japan .................................. 51-61973
Jun. 1, 1976 [JP] Japan .................................. 51-62900

[51] Int. Cl.² ............................................ C01G 43/00
[52] U.S. Cl. ........................................... 423/6; 423/7
[58] Field of Search ................. 423/6, 7; 252/301.1 R

[56] References Cited

U.S. PATENT DOCUMENTS

| 3,511,620 | 5/1970 | Shimokawa | 423/7 |
| 3,869,536 | 3/1975 | James | 423/7 |
| 3,953,569 | 4/1976 | Seko et al. | 423/7 |
| 4,012,480 | 3/1977 | Delvalle | 423/7 |
| 4,049,769 | 9/1977 | Seko et al. | 423/7 |
| 4,059,670 | 11/1977 | Kakihana | 423/7 |

FOREIGN PATENT DOCUMENTS 45-6759   7/1970   Japan ......................................... 423/7

*Primary Examiner*—Richard E. Schafer
*Attorney, Agent, or Firm*—Sprung, Felfe, Horn, Lynch & Kramer

[57] ABSTRACT

A process for continuously separating uranium isotopes by oxidation-reduction reaction using an anion exchanger comprising the steps of subjecting an eluant containing a deactivated oxidizing agent and a deactivated reducing agent as a mixture to oxidation to regenerate the deactivated oxidizing agent, separating the regenerated oxidizing agent from the eluant with an anion exchanger and reusing the regenerated oxidizing agent for continuing the separation of uranium isotopes.

15 Claims, 4 Drawing Figures

CONTINUOUS SEPARATION OF URANIUM ISOTOPES

BACKGROUND OF THE INVENTION

1. Field of the Invention

This invention relates to a process for continuously separating uranium isotopes by oxidation-reduction reaction using an anion exchanger. More particularly, it relates to a process for efficiently regenerating the deactivated oxidizing agent in the course of the separation of uranium isotopes by oxidation-reduction reaction, followed by reusing the regenerated oxidizing agent for continuing the separation of uranium isotopes.

2. Description of the Prior Art

According to one conventional process for separating uranium isotopes by oxidation-reduction reaction using an anion exchanger, a solution containing an oxidizing agent capable of oxidizing uranium (IV) to uranium (VI) is supplied to a developing column packed with an anion exchanger to form an oxidizing agent adsorption zone, followed by supplying a uranium isotope solution containing uranium (IV) to convert a portion of the oxidizing agent adsorption zone to an adsorbed uranium (VI) zone and then supplying a solution containing a reducing agent capable of reducing uranium (VI) to uranium (IV) to reduce uranium (VI) absorbed on the anion exchanger to be eluted in the form of uranium (IV).

Thus, a boundary is formed between the oxidizing agent zone and the uranium adsorption zone in the front portion, in the direction of flow, of the uranium adsorption zone, and the uranium solution recovered from the vicinity of this boundary has a higher concentration of uranium-238. Also a boundary is formed between the uranium adsorption zone and the reducing agent zone in the rear portion, in the direction of flow, of the uranium adsorption zone, and the uranium solution recovered from the vicinity of this boundary has a higher concentration of uranium-235.

In this separation of uranium isotopes it is also known that more than one developing column filled with an anion exchanger may be employed, and the eluted solution containing uranium (IV) is fed from one developing column to the next packed with an anion exchanger where an oxidizing adsorption zone is already formed, thereby continuously forming a uranium adsorption zone, and then passing a solution containing a reducing agent therethrough.

These operations of separating uranium isotopes are so-called fixed bed type operations of separating uranium isotopes.

According to another conventional process for separating uranium isotopes by oxidation-reduction reaction using anion exchanger, which is a so-called moving bed type operation, an anion exchanger having adsorbed an oxidizing agent thereon is supplied to a developing column where a uranium adsorption zone is already formed, and at the same time a solution containing a reducing agent is supplied to the developing column counter-currently to the flow of the anion exchanger, thereby performing oxidation and reduction reactions at the boundary between the uranium adsorption zone and the oxidizing agent and at the boundary between the uranium adsorption zone and the reducing agent, respectively. According to this moving bed type operation, the uranium adsorption zone is in a standstill state in a developing column by moving an anion exchanger in contrast to the uranium adsorption zone which moves in a developing column according to those fixed bed type operations. However, the principle of separating uranium isotopes is the same in the operations of the both types, and a deactivated oxidizing agent and a deactivated reducing agent are eluted as a mixture from a developing column in the operation of the both types.

In these operations uranium atoms should be in an anionic form. Uranium ion which is not coordinated with a ligand is usually in a cationic form. Thus, a uranium cation is converted to a uranium anion by forming complex compounds with negatively charged ligands. As used herein and in the appended claims, the term "uranium (IV)" denotes all tetravalent uranium ions including complex ions, and the term "uranium (VI)" denotes all hexavalent uranium ions including complex ions.

Heretofore, the deactivated oxidizing agent and the deactivated reducing agent which are present as a mixture in the eluant from a developing column are firstly separated from each other by a separator such as an extracting means, a column packed with an ion exchange resin, a precipitating vessel, etc. Secondly, the deactivated oxidizing agent thus separated is regenerated using another oxidizing agent such as oxygen, and on the other hand the deactivated reducing agent is regenerated using another reducing agent such as hydrogen, and the regenerated oxidizing agent and reducing agent are reused, respectively, for further separation of uranium isotopes by oxidation-reduction reaction.

SUMMARY OF THE INVENTION

According to the present invention there is provided a process for continuously separating uranium isotopes by oxidation-reduction reaction which comprises the steps of:

forming a uranium adsorption zone on a body of anion exchanger, displacing the uranium adsorption zone through the body of anion exchanger by oxidation and reduction reactions of uranium with an oxidizing agent and a reducing agent in contact with the uranium adsorption zone, subjecting an eluant containing the deactivated oxidizing agent and the deactivated reducing agent to an oxidation reaction to regenerate the deactivated oxidizing agent, separating the regenerated oxidizing agent from the resulting eluant with an anion exchanger, and reusing the regenerated oxidizing agent separated for the oxidation of uranium.

DETAILED DESCRIPTION OF THE INVENTION

Figure 1:
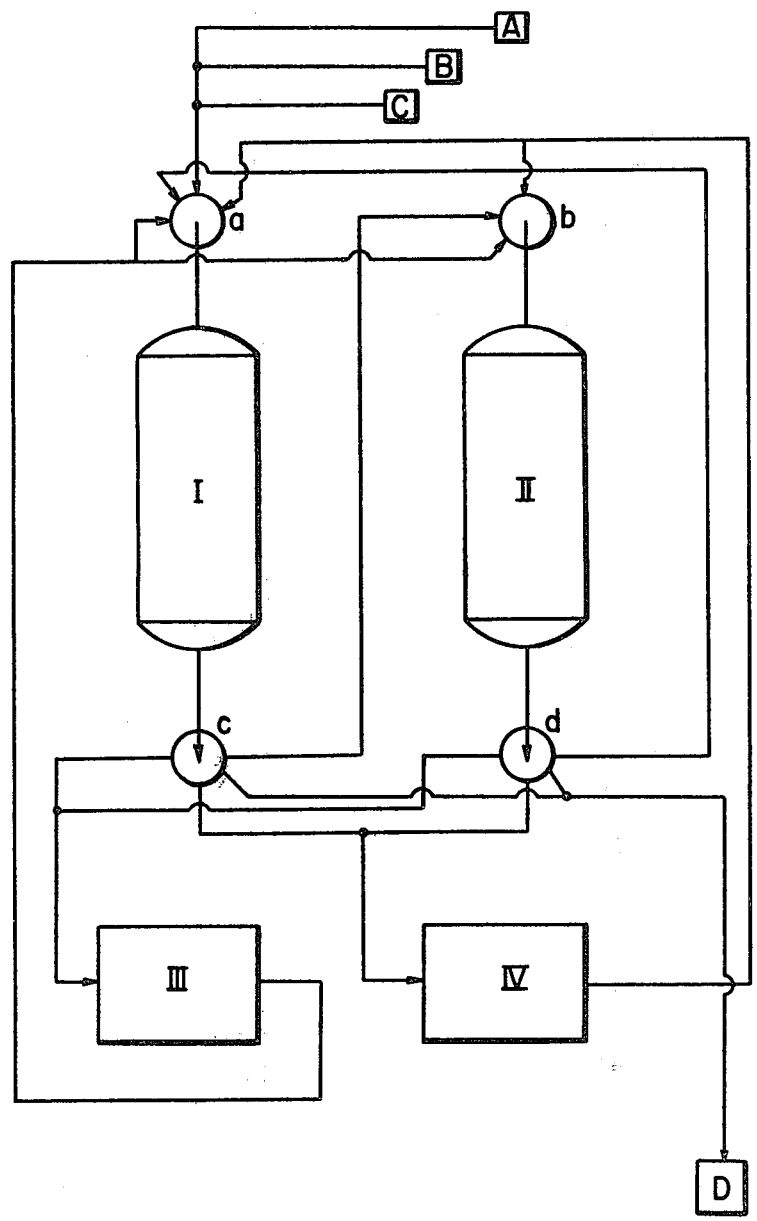
FIG. 1 illustrates the flow diagram of an apparatus of one embodiment of this invention wherein two developing columns are employed.

In the present invention, the term "body" denotes an anion exchanger or an aggregate of anion exchanger which is held in one vessel or two or more interconnected vessels where a uranium adsorption zone can move. The term "bed" denotes an aggregate of anion exchanger which is uniformly held in one vessel or two or more interconnected vessels.

In carrying out the present invention it is preferred to employ a column packed with an anion exchanger where a uranium adsorption zone can be moved with less perturbation.

According to the present invention, the regenerated oxidizing agent can be separated from the resulting eluant containing the regenerated oxidizing agent and the deactivated reducing agent as a mixture after the oxidation of an eluant containing a deactivated oxidizing agent and a deactivated reducing agent using the anion exchanger which has been employed in the separation of uranium isotopes, and as a result the efficiency of separating uranium isotopes can be remarkably increased. Namely, when a uranium adsorption zone has completed moving in a column packed with an anion exchanger, the uranium adsorption zone is transferred in a state where the quantity of liquid mixed therewith is decreased, from the column to a reservoir, while a solution containing the deactivated oxidizing agent and the deactivated reducing agent eluted and collected during the development of the uranium adsorption zone in the column is oxidized, and subsequently supplied to the column after completion of the transfer of the uranium adsorption zone where the regenerated oxidizing agent is alone adsorbed on the anion exchanger and the deactivated reducing agent is eluted and separated. After completion of the adsorption of the regenerated oxidizing agent on the anion exchanger the uranium adsorption zone is returned from the reservoir to the column for separating uranium isotopes to form a uranium adsorption zone, and subsequently an active reducing agent solution is supplied to the column in order to further continue development of the uranium adsorption zone. Thus, repeating this procedure it is possible to continuously perform development of a uranium adsorption zone in one column.

According to the present invention the continuous separation of uranium isotopes is efficiently carried out by using more than one developing column packed with an anion exchanger in the fixed bed type column operation or by at least one developing column holding a moving anion exchanger in the moving bed type column operation.

More specifically, in the fixed bed type column operation, while development of a uranium adsorption zone is performed in one developing column or over two or more developing columns, an eluant containing the deactivated oxidizing and the deactivated reducing agent as a mixture is subjected to oxidation, and the resulting eluant is supplied to at least one of the remaining developing columns where development is not being performed and an oxidizing agent adsorption zone is newly formed, while the deactivated reducing agent is eluted. The uranium adsorption zone which has thus far been subjected to a separation of uranium isotopes is transferred to the developing column where an oxidizing agent zone is formed and the uranium adsorption zone moves the oxidizing agent zone in the direction of flow, and subsequently a reducing agent is supplied to the resulting uranium adsorption zone. Thus, an oxidizing agent adsorption zone is endlessly formed in a developing column through which a uranium adsorption zone and subsequently a reducing adsorption zone have already passed.

In the moving bed type column operation, while the development of a uranium adsorption zone is performed in one developing column or over two or more developing columns, an eluant containing the deactivated oxidizing agent and the deactivated reducing agent as a mixture is subjected to oxidation, and the resulting eluant is supplied to the column or another vessel where the regenerated oxidizing agent is adsorbed on the anion exchanger which has been transferred from the uranium developing column, while the deactivated reducing agent is separated and eluted. Then, the anion exchanger having adsorbed the regenerated oxidizing agent thereon is supplied to the uranium developing column.

Advantageously, the whole or part of the deactivated reducing agent eluted and separated either in the fixed bed type column operation or in the moving bed type column operation may be regenerated and reused for further reduction of uranium. Alternatively, a new reducing agent or a mixture of a new reducing agent and the regenerated reducing agent may also be employed for further reduction of uranium.

For simplicity in the following explanation, an oxidizing agent, a reducing agent and uranium are denoted by the symbols "O", "R" and "U", respectively, and a lower oxidation number and a higher oxidation number are denoted by the suffix "I" and suffix "II", respectively. For example, $O_I$ denotes an oxidizing agent in the deactivated state whose oxidation number is decreased, $R_I$ denotes a reducing agent in the active state with a lower oxidation number, and $U_I$ and $U_{II}$ denote uranium (IV) and uranium (VI), respectively.

The present invention has been accomplished on the basis of the discovery and utilization of a phenomenon about the adsorbability of uranium, an oxidizing agent and a reducing agent which may be used in the separation of uranium isotopes by oxidation-reduction reaction on anion exchangers.

Since the principle of separating uranium isotopes and the phenomenon about the adsorbability of uranium, an oxidizing agent and a reducing agent are the same either in the fixed bed type column operation or in the moving bed type column operation as described above, the following explanation will be made to the fixed bed type column operation.

First, in order to form an oxidizing agent adsorption zone in a developing column packed with an anion exchanger, $O_{II}$ must be adsorbed on the anion exchange resin. Second, in order to form a uranium adsorption zone, $U_{II}$ must be adsorbed on the anion exchanger by a displacement of $O_{II}$ by $U_{II}$ resulting from the reaction of $U_I$ and $O_{II}$. At this time, $O_I$ must pass through the anion exchanger in the direction of flow without a displacement of the $O_{II}$ adsorption zone by $O_I$. With regard to $R_I$ for reducing the $U_{II}$ adsorption zone, it is preferred for $R_I$ to have as low an adsorbability on the anion exchanger as possible. Further, it is essential for the adsorbability of $R_{II}$ to be lower than that of $O_{II}$ because if the adsorbability of $R_{II}$ is higher than that of $O_{II}$, it is difficult for $O_{II}$ adsorb on the anion exchanger, and as the result, a clear uranium adsorption zone cannot be successively formed. Thus, the relationship of adsorbability on an anion exchanger of $O_I$, $O_{II}$ and $R_{II}$ must be $O_{II} > O_I$ and $O_{II} > R_{II}$.

Furthermore, in order to form a complete uranium adsorption zone it is preferred for the adsorbability on an anion exchanger of $U_{II}$ to be high and for that of $U_I$ to be low.

According to the conventional method, first, $O_I$ is separated from an eluant containing $O_I$ and $R_{II}$ from a developing column, and second $O_I$ is regenerated or oxidized to $O_{II}$, and $R_{II}$ is regenerated or reduced to $R_I$, separately. However, with respect to the combination of $O_I$ and $R_{II}$, the separation of $O_I$ from $R_{II}$ according to known methods is incomplete and time-consuming due to small differences in their adsorbability. In contrast, with respect to the combination of $O_{II}$ regenerated from $O_I$ and $R_{II}$ the differences in their adsorbability are remarkable. Particularly, $O_{II}$ not only has a greater affinity for anion exchangers than $R_{II}$ as described above but also $O_{II}$ has a greater affinity for extraction media than $R_{II}$. Thus, $O_{II}$ can be readily and easily separated from $R_{II}$.

Now, an eluant containing $O_I$ and $R_{II}$ from a developing column is introduced into an oxidizing apparatus where the eluant is converted to an eluant containing $O_{II}$ and $R_{II}$ by oxidation. When the resulting eluant is fed again to the developing column, $O_{II}$ alone is adsorbed on the anion exchanger and at the same time $R_{II}$ is eluted without adsorbing on the anion exchanger. However, it is essential that $R_{II}$ not be further oxidized to irreversibly decompose or change in oxidizing the solution containing $O_I$ and $R_{II}$. It has now been confirmed that in various combinations of oxidizing agents and reducing agents usable in the separation of uranium isotopes by oxidation-reduction reaction, the oxidation of $O_I$ in the presence of $R_{II}$ generally does not affect $R_{II}$.

In addition to the relationships of adsorbability on an anion exchanger of an oxidizing agent and a reducing agent as described above, the oxidizing agents and reducing agents which may be employed in this invention must satisfy the following relationship with regard to formal oxidation-reduction potentials (oxidation state/reduction state);

$$E_O^O(O_{II}/O_I) > E_U^O(U_{II}/U_I) > E_R^O(R_{II}/R_I)$$

wherein $E_O^O$, $E_U^O$ and $E_R^O$ represents the formal oxidation-reduction potential of the oxidizing agent, uranium and the reducing agent, respectively.

The separation of uranium isotopes according to this invention is carried out in an acidic solution. The hydrogen ion concentration of the acidic solution typically ranges from about $10^{-3}$ M to about 11 M, preferably from about $10^{-1}$ M to about 10 M and more preferably from about 1 M to about 8 M. The solvent medium may be water, an organic solvent such as methanol, ethanol, ethylene glycol, dioxane, formic acid, acetone, etc. or a mixture of water with the organic solvent. Typical examples of suitable acids are inorganic acids such as hydrochloric acid, hydrobromic acid, sulfuric acid and hydrofluoric acid, etc.

The acidic solution may also contain an electron exchange catalyst as disclosed in co-pending U.S. patent application Ser. No. 687,840, filed May 19, 1976 and Ser. No. 711,748, filed Aug. 4, 1976. The disclosure of these applications is specifically incorporated herein by reference.

The concentration of uranium ions in the solution ranges from about $10^{-3}$ M to about 4 M and preferably from about $10^{-2}$ M to about 2 M, and the concentration of negatively charged ligands typically ranges from about $10^{-3}$ M to about 12 M, preferably from about $10^{-1}$ M to about 10 M and more preferably from about 1 M to about 8 M. Exemplary ligands which can be used include inorganic ions such as $F^-$, $Cl^-$, $Br^-$, $NO_3^-$, $SCN^-$, $CN^-$, $SO_4^{2-}$, in the form of the acid or water soluble salts such as the sodium, potassium, or ammonium salts, etc.; ions of monocarboxylic acids such as acetic acid, monochloroacetic acid, dichloroacetic acid, etc.; ions of dicarboxylic acids such as oxalic acid, malonic acid, maleic acid, phthalic acid, etc.; ions of hydroxy acids such as glycolic acid, $\beta$-hydroxypropionic acid, citric acid, lactic acid, hydroxysuccinic acid, tartaric acid, sulfosalicylic acid, etc.; ions of amino acids such as glycine, alanine, $\beta$-alanine, aspartic acid, glutamic acid, etc.; ions of aminopolycarboxylic acids such as nitrilotriacetic acid, ethylenediamine tetraacetic acid, 1,2-cyclohexanediamine tetraacetic acid, etc.; and the water soluble salts such as the sodium, potassium and ammonium salts of these acids.

The temperature of separating uranium isotopes according to this invention typically ranges from about 5° C. to about 280° C. A preferred temperature ranges from about 40° C. to about 200° C. and a more preferred temperature ranges from about 60° C. to about 180° C.

The pressure in separating uranium isotopes in the present process is not critical, and can be varied typically from atmospheric pressure to about 80 kg/cm². In general, the separation is carried out above atmospheric pressure at a temperature below the boiling point of the solvent medium employed in the solution. Alternatively, when the temperature is higher than the boiling point of the solvent medium employed, the separation is carried out under a pressure above atmospheric sufficient to prevent the solvent medium from boiling.

The linear velocity of boundary displacement typically ranges from about 5 cm per day to about 80 m per day, preferably from about 1 mm to about 50 m per day and more preferably from about 5 m to 30 m per day.

Any anion exchangers which can retain uranium (VI) and can selectively release uranium (IV) formed by a reducing agent as an eluant can be used as the anion exchanger in this invention. Examples of such anion exchangers are disclosed in Friedrich Helffreich, *Ion Exchange*, Chap. 3, pp 26–71, McGraw Hill, (1962), and in U.S. Pat. Nos. 2,883,349; 2,597,439; 2,591,574; 2,597,440; 2,614,099; 2,739,906 and 3,092,617; British Pat. Nos. 785,157; 849,122; 932,125; 932,126 and 1,082,635; Belgian Pat. No. 62,714; French Pat. No. 1,483,946; Abrams, *Ind. Eng. Chem.*, 48, 1469 (1956); and C. B. Amphlett, *Inorganic Ion Exchangers*, Chap. 5, pp 92–111, Elseviere Publishing Co., (1964). The disclosure of these patents described hereinabove is specifically incorporated herein by reference.

Ion exchangers which are preferably employed in the process of the present invention are strongly basic anion exchangers having quaternary ammonium groups therein prepared by chloromethylating styrene-divinylbenzene copolymers, followed by amination, or weakly basic anion exchangers having primary or tertiary amine groups therein.

In using these anion exchangers for the separation of uranium isotopes by the process of this invention, it is more preferred for the adsorption of ions onto and desorption of or release of ions from the anion exchanger to occur quite quickly in order to selectively adsorb or release uranium (VI) and uranium (IV) formed by oxidation and reduction reactions, and further to prevent the isotopes thus separated from again being mixed. From this standpoint, use of the anion exchangers disclosed in co-pending U.S. patent application Ser. No. 687,843, filed May 19, 1976 and Ser. No. 687,844, filed May 19, 1976 is particularly in the present invention. The disclosure of these applications is specifically incorporated herein by reference. These anion exchangers have a number average particle diameter of about 20 to about 200 microns and at least about 80% of all of the particles have a particle diameter of ⅔ to 3/2 times the average particle diameter and at least about 90% of all of the particles have a ratio of minimum diameter to maximum diameter of ½ to 1. When developing columns packed with such anion exchangers are employed, the development of a solution can be carried out with good yields due to a low degree of perturbation of the flow and pressure loss in these columns.

The solution conditions and the anion exchangers thus selected can also be employed without hardly any modification in the moving bed type column operation for separating uranium isotopes.

The above described relationships of adsorbability on an anion exchanger and of oxidation-reduction potentials vary within wide limits depending upon the factors such as the oxidizing agent and reducing agent selected, the hydrogen ion concentration chosen, the ligand selected and the amount of ligand employed.

Any oxidizing agents and reducing agents which satisfy the abovedescribed relationships of adsorbability on an anion exchanger and of oxidation-reduction potentials can be employed in this invention.

Exemplary oxidizing agents include metal ions of trivalent thallium, hexavalent molybdenum, pentavalent antimony, divalent mercury, hexavalent chromium, trivalent iron and tetravalent cesium. Of these oxidizing agents trivalent iron ion is especially preferred from the standpoint of its commercial availability, easiness in regeneration with oxygen, rate of oxidation of uranium (IV) to uranium (VI) and adsorbability on an anion exchanger.

The concentration of the oxidizing agent typically ranges from about 0.001 M to about 6 M, and preferably from about 0.04 M to about 3.5 M. With regard to trivalent iron ion, the concentration preferably ranges from about 0.012 M to about 3.4 M.

Exemplary reducing agents include metal ions of trivalent titanium, divalent vanadium, trivalent vanadium, trivalent niobium, divalent chromium and monovalent copper. Of these reducing agents, trivalent titanium ion and divalent vanadium ion are especially preferred from the standpoint of their commercial availability, easiness in regeneration with hydrogen, rate of reduction of uranium (VI) to uranium (IV) and adsorbability on an anion exchanger. The concentration of the reducing agent typically ranges from about 0.001 M to about 6 M, and preferably from about 0.04 M to about 3.5 M. With regard to trivalent titanium ion the concentration preferably ranges from about 0.011 M to about 1.8 M, and with regard to divalent vanadium ion the concentration preferably ranges from about 0.014 M to about 2.4 M.

Any combinations of the above described oxidizing agents and reducing agents may be employed in the separation of uranium isotopes by oxidation-reduction reaction according to this invention. Preferred combinations are trivalent iron ion-trivalent titanium ion and trivalent iron ion-divalent vanadium ion. Using these combination, both the oxidation boundary and the reduction boundary are clear and a uranium adsorption zone becomes clearer.

The rate of oxidation and the adsorbability on an anion exchanger of a variety of oxidizing agents and the rate of reduction and the adsorbability on an anion exchanger of a variety of reducing agents are shown in Tables 1 and 2, respectively.

Table I

| | Oxidizing Agents | | |
|---|---|---|---|
| Oxidizing Agent (metal ion) Valence of $O_{II}$/ Valence of $O_I$ | Rate of Oxidation (%) | Distribution Coefficient $O_{II}/O_I$ | Appearance of Boundary between Oxidizing Agent Zone and Uranium Absorption Zone in Chromatography |
| Fe (III/II) | 99 | $15/10^{-1}$ | Clear |
| Tl (III/I) | 97 | 100/at most $10^{-2}$ | Clear |
| Cr (VI/III) | 99 | $10^{-1}$/at most $10^{-2}$ | Slightly unclear |
| Mo (VI/III) | 35 | 100/at most $10^{-1}$ | Slightly unclear |

Solution subjected to oxidation contained 0.2 M of uranium (IV) and 4.8 M of hydrochloric acid.
Solution Temperature: 60° C.
Rate of Oxidation: Rate of conversion of uranium (IV) to uranium (VI) after 30 seconds when the solution was mixed with a solutiion with a solution containing 0.2 M of oxidizing agent and 4.8 M of hydrochloric acid.
Distribution Coefficient: With respect to a strongly basic resin having quaternary ammonium groups therein, an exchange capacity of 3.5 milliequivalent/g. and a particle size of 100 to 200 mesh (150 to 75 microns) (Dowex 1 × 10, tradename) and the same conditions of solution as described above.

Table 2

| | Reducing Agent | | |
|---|---|---|---|
| Reducing Agent (metal ion) Valence of $R_I$ Valence of $R_{II}$ | Rate of Reduction (%) | Distribution Coefficient $R_I/R_{II}$ | Appearance of Boundary between Reducing Agent Zone and Uranium Adsorption Zone in Chromatography |
| Ti (III/IV) | 99 | $10^{-1}$/at most $10^{-2}$ | Clear |
| V (II/III) | 99 | at most $10^{-2}$/at most $10^{-2}$ | Clear |
| Cu (I/II) | 42 | 100/at most 1 | Slightly unclear |
| Cr (II/III) | 98 | at most $10^{-2}$/at most $10^{-1}$ | Slightly unclear |

Solution subjected to reduction contained 0.2 M of uranium (VI) and 4.8 M of hydrochloric acid.
Solutiion Temperature: The same as in Table 1.
Rate of Reduction: Rate of conversion of uranium (VI) to uranium (IV) after 30 seconds when the solution was mixed with a solution containing 0.2 M of reducing agent and 4.8 M of hydrochloric acid.
Distribution Coefficient: The same as in Table 1.

As is clear from the values shown in Tables 1 and 2, when an oxidizing agent having a higher rate of oxidation or a reducing agent having a higher rate of reduction and an oxidizing agent having a lower distribution coefficient in the $O_I$ state or a reducing agent having a lower distribution coefficient in the $R_{II}$ state are employed the boundaries become clearer and the separation efficiency of uranium isotopes is increased.

Any conventional methods of regenerating oxidizing agents and reducing agents can be employed in the process in order to regenerate deactivated oxidizing agents and deactivated reducing agents.

Exemplary methods include oxidizing methods using oxygen, catalytic reducing methods using hydrogen, electrolytic oxidizing methods, electrolytic reducing methods, oxidizing methods using an oxidizing agent and reducing methods using a reducing agent.

In carrying out the regeneration of deactivated oxidizing agents and reducing agents it is preferred for an eluant containing a deactivated oxidizing and/or a deactivated reducing agent from a developing column to be subjected to the regeneration treatment and the resulting eluant to be reused for continuing the separation of uranium isotopes without changing the composition and temperature of the eluant. Accordingly, the regenerating conditions are preferably so selected that the conditions of an eluant containing a deactivated oxidizing agent and/or a deactivated reducing agent are not changed. Therefore, regenerating methods using an oxidizing agent or a reducing agent in excess amount disadvantageously change the compositions of an eluant.

Exemplary oxidizing agents which can be used include hydrogen peroxide, ozone, nitrogen dioxide, etc. and exemplary reducing agents which can be used include carbon monoxide, formic acid, etc.

From this standpoint, with regard to oxidation, oxidizing methods using oxygen are more preferable in the present process, and with regard to reduction, catalytic reducing methods using hydrogen in the presence of a catalyst are more preferred. According to these methods hardly any change in the eluant conditions such as a hydrogen ion concentration, ligand concentration, etc., before and after the regeneration treatment is observed, and furthermore, the regenerating conditions can be varied over a wide range. On the other hand, in using electrolytic oxidizing or reducing methods, the evolution of hydrogen gas and chlorine gas is inevitable and as a result the hydrogen ion concentration and the ligand concentration are slightly varied. Two examples of regenerating treatments are shown in Table 3.

Oxidizing methods using oxygen are typically carried out under an oxygen partial pressure of from atmospheric to about 200 kg/cm$^2$ at a temperature of about 20° C. to about 250° C. Catalytic reducing methods using hydrogen in the presence of a catalyst are typically carried out under a hydrogen partial pressure of from atmospheric to about 200 kg/cm$^2$ at a temperature of about 20° C. to about 250° C. Exemplary reducing method catalysts include ruthenium, rhodium, palladium, osmium, iridium and platinum metals. These metals are generally supported on a carrier such as carbon, tar pitch, acid resistant alumina, glass, an ion exchange resin, an insoluble metal powder, etc. of any shape in an amount of about 0.001 to about 10% by weight, and preferably from about 0.01 to about 5% by weight.

Oxidizing methods using oxygen and catalytic reducing methods using hydrogen may be carried out not only batchwise but also continuously in a column provided with bubble plates or filled with packing agents for oxidation, and in a column filled with a catalyst or in a vessel where a catalyst is fluidized for reduction. The oxidizing apparatus and the reducing apparatus may be a multiple state type and part of the eluant after the regeneration treatment may also be recycled to the oxidizing apparatus or the reducing apparatus.

The oxidizing agents, reducing agents and regenerating methods as described above can be employed in the same manner in either of the fixing bed type operation and the moving bed type operation for separating uranium isotopes.

To provide a clearer and better understanding of this invention, reference will now be made to preferred embodiments thereof in connection with the flow diagrams shown in the drawings.

Firstly, the separation of uranium isotopes using a fixed bed type developing column will be explained in greater detail.

In the embodiment illustrated in FIG. 1 which is a basic recycling system according to the process of the present invention, I and II denote developing columns, respectively; III an oxidizing apparatus; IV a reducing apparatus; a, b, c and d, each electrically operable switchover valves; A a reservoir for a reducing agent solution; B a reservoir for a uranium solution; C a reservoir for an oxidizing agent solution; and D a reservoir for a product.

Table 3

| Regeneration Method | Operation Conditions | | Rate of Reduction (%) | Note |
|---|---|---|---|---|
| Electrolytic Reduction Method | Cathode | carbon rod | | |
| | Anode | platinum plate | | |
| | Separation of cathodic chamber from anodic chamber | cation exchange menbrane | 94 | Concentration of hydrochloric acid was reduced from 4.8 M to 4.5 M. Current efficiency was reduced from 80% to 42%. |
| | Anolyte | 2M sulfuric acid | | |
| | Temperature | 80° C. | | |
| | Voltage | 4–6V | | |
| | Current | 8–10A | | |
| | Application of current | 30 minutes | | |
| Hydrogen Reduction Method | Partial pressure of hydrogen | 16 kg/cm$^2$ | | |
| | catalyst | platinum metal supported on carbon particles | 97 | — |
| | Temperature | 80° C. | | |
| | Reaction period | 8 minutes with stirring | | |

Eluant subjected to regeneration treatment contained 0.4 M of tetravalent titanium ion and 4.8 M of hydrochloric acid.
Temperature of eluant: 80° C.

Prior to starting development an anion exchanger is uniformly packed in developing columns I and II, and first, O$_{II}$ is supplied to developing column I through route C-a-I to form an $O_{II}$ adsorption zone. Second, $U_I$ is supplied to developing column I through route B-a-I and brought into contact with the $O_{II}$ adsorption zone to form a $U_{II}$ adsorption zone. When the $U_{II}$ adsorption zone has expanded to an appropriate length, development is started by supplying $R_I$ to developing column I through route A-a-I, and $R_I$ is brought into contact with the $U_{II}$ adsorption zone to elute $U_{II}$ while simultaneously reducing $U_{II}$ to $U_I$. Thus a $U_{II}$ adsorption zone is moved in the downstream direction.

At this time, a mixed solution containing $O_I$ and $R_{II}$ as a mixture is eluted from developing column I. This eluant, without any separation of $O_I$ from $R_{II}$, is supplied to oxidizing apparatus III through route I-c-III, followed by oxidizing $O_I$ to $O_{II}$ in oxidizing apparatus III where no reaction of $R_{II}$ occurs. Then, the resulting solution containing $O_{II}$ and $R_{II}$ after oxidation is supplied to developing column II through route III-b-II to form an $O_{II}$ adsorption zone as in the first step of this operation and simultaneously $R_{II}$ eluted from developing column II is supplied to reducing apparatus IV through route II-d-IV, followed by reducing $R_{II}$ to $R_I$ in reducing apparatus IV. Then the $R_I$ thus obtained is supplied to developing column I for further achieving a development of the uranium adsorption zone. Thus, the uranium adsorption zone is continuously moved in the downstream direction and finally reaches the bottom of developing column I.

Subsequently, the uranium eluant is supplied through route I-c-b-II to developing column II where an $O_{II}$ adsorption zone is already formed. When the uranium adsorption zone has completely moved from developing column I to developing column II, the route of supplying $R_I$ is changed to route IV-b-II to further move the uranium adsorption zone in the downstream direction. The eluant containing $O_I$ and $R_{II}$ from developing column II is supplied through route II-d-III to oxidizing apparatus III where the eluant is subjected to the same oxidation treatment as described above, and the resulting eluant containing $O_{II}$ and $R_{II}$ is supplied through route III-a-I to developing column I to form an $O_{II}$ adsorption zone while $R_{II}$ eluted from developing column I is supplied through route I-c-IV to reducing apparatus IV where $R_{II}$ is reduced to $R_I$. Then $R_I$ thus obtained is supplied through route IV-b-II to developing column II for further achieving a development of the uranium adsorption zone in developing column II. Thus, the uranium adsorption zone is continuously moved in the downstream direction and finally reaches the bottom of developing column II. Then the uranium eluant is supplied through route II-d-a-I to developing column I where an $O_{II}$ adsorption zone is already formed. Thus, this operation is repeated until the composition of uranium isotopes becomes a desirable composition, and the product is collected through route c-D or route d-D.

Figure 2:
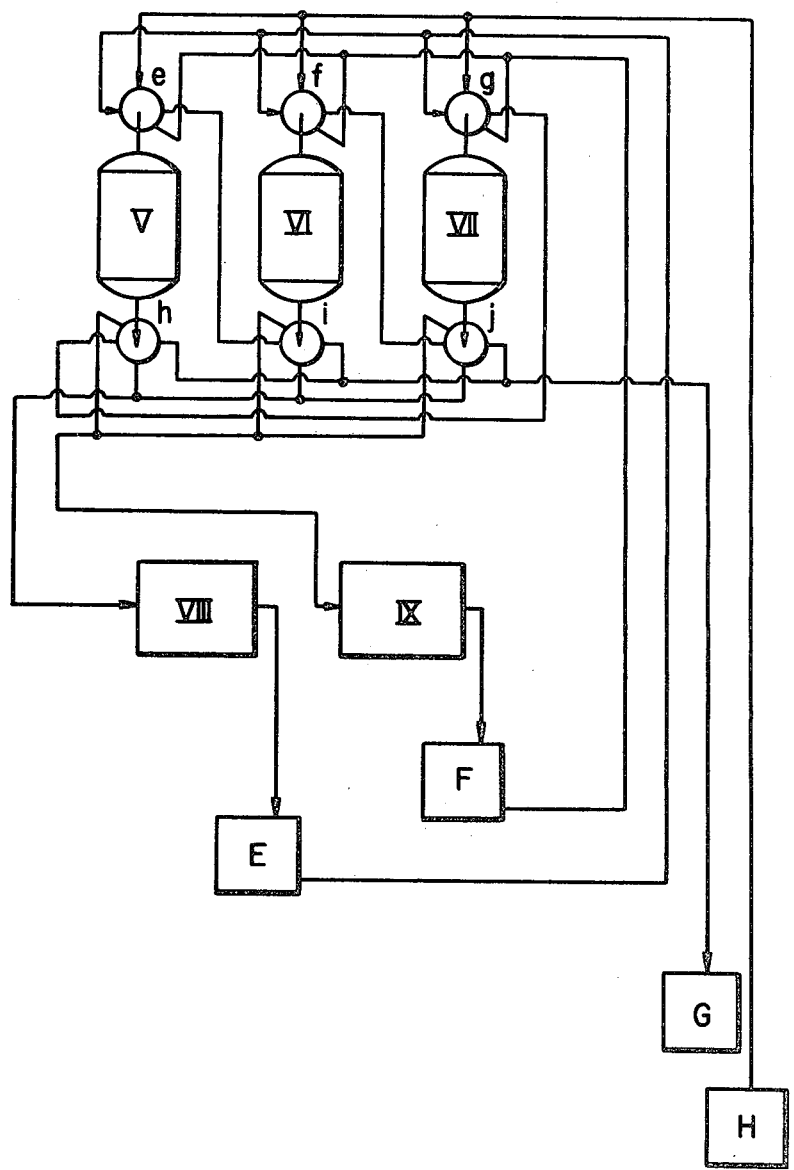
FIG. 2 illustrates the flow diagram of an apparatus of another embodiment of this invention wherein three developing columns are employed.

In another embodiment of this invention illustrated in FIG. 2, V, VI and VII denote developing columns, respectively; VIII an oxidizing apparatus; IX a reducing apparatus; e, f, g, h, i and j, each electrically operable switch-over valves; E a reservoir for an oxidizing agent solution; F a reservoir for a reducing agent solution; G a reservoir for a product and H a reservoir for a uranium solution.

Prior to starting the operation, an anion exchanger is uniformly packed in each of developing columns V, VI and VII, $O_{II}$ is charged in reservoir E, $R_I$ in reservoir F and a starting uranium solution in reservoir H. First, $O_{II}$ is supplied through route E-e-V-h-VIII to form an $O_{II}$ adsorption zone in developing column V. Second, $U_I$ is supplied through route H-e-V to form a $U_{II}$ adsorption zone in developing column V, and simultaneously $O_{II}$ is supplied through route E-g-VII-j-VIII to form an $O_{II}$ adsorption zone in developing column VII. When the $U_{II}$ adsorption zone has expanded to the vicinity of the lower portion of developing column I, $R_1$ is supplied through route F-e-V-h-VIII to start development in developing column V, and when the $U_{II}$ adsorption zone has reached the lower portion of developing column V, the flow route of $R_I$ is switched over to route F-e-V-h-g-VII-j-VIII to move the $U_{II}$ adsorption zone over developing columns V and VII. The eluant containing $O_I$ and $R_{II}$ as a mixture from developing column VII through route j-VIII is oxidized in oxidizing apparatus VIII to give a solution containing $O_{II}$ and $R_{II}$ as a mixture. The resulting solution is supplied through route E-f-VI-i-IX to form an $O_{II}$ adsorption zone in developing column VI and an eluant containing $R_{II}$ is fed to reducing apparatus IX through route VI-i-IX and reduced in reducing apparatus IX to form a solution containing $R_I$, and subsequently the solution is returned to reservoir F. In other words, the flow route of a solution containing a reducing agent in this stage is F-e-V-h-g-VII-j-VIII-E-f-VI-i-IX-F.

When the development has proceeded further and all the uranium adsorption zone in developing column V has been moved to developing column VII, the flow route of the solution containing a reducing agent is switched over to route F-g-VII-j-f-VI-i-VIII-E-e-V-h-IX-F. At this time, developing column VI where an $O_{II}$ adsorption zone is already formed is ready to receive the uranium adsorption zone from developing column VII. After the development has proceeded still further and all the uranium adsorption zone in developing column VII has been moved to developing column VI, the flow route is switched over to route F-f-VI-i-e-V-h-VIII-E-g-VII-j-IX-F. Thus, as the uranium adsorption zone is moved by successively switching over the solution flow route, the separation of uranium isotopes proceeds at the front boundary between a uranium adsorption zone and an oxidizing agent zone and at the rear boundary between the uranium adsorption zone and a reducing agent zone. When the composition of the isotopes has reached a desirable composition, the product can be collected using any route h-G, i-G and j-G. For example, when the product is collected from the bottom of developing column VI, the solution flow route may be either route F-g-VII-j-f-VI-i-G or route F-f-VI-i-G.

Secondly, the separation of uranium isotopes using a moving bed type developing column will now be explained. According to one embodiment of this invention in the moving bed type column operation illustrated in FIG. 4, XVIII denotes a moving bed type developing column for separating uranium isotopes; Q and R reservoirs for an anion exchanger; t a rotary valve for feeding an anion exchanger; u a rotary valve for withdrawing an anion exchanger; XIX an apparatus where an active oxidizing agent is adsorbed on an anion exchanger and at the same time a deactivated reducing agent is separated; XX an oxidizing apparatus; XXI a reducing apparatus; S a reservoir for a solution containing deactivated oxidizing agent and deactivated reducing agent; T a reservoir for an oxidizing agent solution; U a reservoir for a solution containing deactivated reducing agent; V a reservoir for a reducing agent solution; W a reservoir for a starting uranium solution; 6, 7, 8, 9 and 10, each metering pumps; v a three-way switch-over valve; α and γ nozzles for withdrawing uranium separated and β a nozzle for supplying a natural uranium solution. The heavy lines show the transfer direction of an anion exchanger by transfer means such as a belt conveyer, a screw conveyor, etc. and the light lines show the flow direction of reaction solutions.

Prior to starting the operation, an anion exchanger is packed in developing column XVIII and apparatus XIX. In apparatus XVIII, $O_{II}$ is already adsorbed on the anion exchanger. Further, $O_{II}$ is charged in reservoir T, $R_I$ in reservoir V and a starting uranium solution in reservoir W. First, $U_I$ is supplied through route W-10-v-XVIII to form a $U_{II}$ adsorption zone in developing column XVIII. Second, when the $U_{II}$ adsorption zone has expanded to an appropriate length, $R_I$ is supplied through route V-9-v-XVIII-S to move the uranium adsorption zone in developing column XVIII. When the uranium adsorption zone has reached an appropriate position a continuous operation is started and also the transfer of an anion exchanger is started. In the stationary state the flow route of the solution starting at reservoir V is route V-9-v-XVIII-S-6-XX-T-7-XIX-U-8-XXI-V. At this time in oxidizing apparatus XX the eluant containing $O_I$ and $R_{II}$ as a mixture is oxidized to a solution containing $O_{II}$ and $R_{II}$ as a mixture, and in apparatus XIX only $O_{II}$ is adsorbed on an anion exchanger and $R_{II}$ is eluted and supplied through route XIX-U-8-XXI to reducing apparatus XXI where $R_{II}$ is reduced to $R_I$ which is subsequently supplied to developing column XVIII through route V-9-v-XVIII. In the stationary state the transfer route of the anion exchanger starting at developing column XVIII is route XVIII-u-R-XIX-Q-t-XVIII. In apparatus XIX an anion exchanger selectively adsorbs $O_{II}$ thereon in the solution containing $O_{II}$ and $R_{II}$ as a mixture and the anion exchanger having adsorbed $O_{II}$ thereon is fed to developing column XVIII.

In the above described operation the length and position of the uranium adsorption zone in developing column XVIII is so adjusted that nozzle α is positioned in the vicinity of the oxidation region of the uranium adsorption zone, nozzle γ in the vicinity of the reduction region of the uranium adsorption zone and nozzle β in the central portion of the uranium adsorption zone by the flow amount of the solution and the transfer amount of the anion exchanger. After a stationary state has achieved by continuing the operation from start-up, the recovery of uranium separated is continuously performed from nozzles α and γ and the supply of a natural uranium solution as a starting solution continuously from nozzle β.

Thus, according to the process of this invention the continuous separation of uranium isotopes can be efficiently performed without requiring any steps of separating a deactivated oxidizing agent from a deactivated reducing agent. Furthermore, the separation of a regenerated oxidizing agent from a deactivated reducing agent can be readily and easily performed using an anion exchanger which selectively adsorbs the regenerated oxidizing agent.

The following examples are given to further illustrate the present invention in greater detail.

EXAMPLE 1

Figure 3:
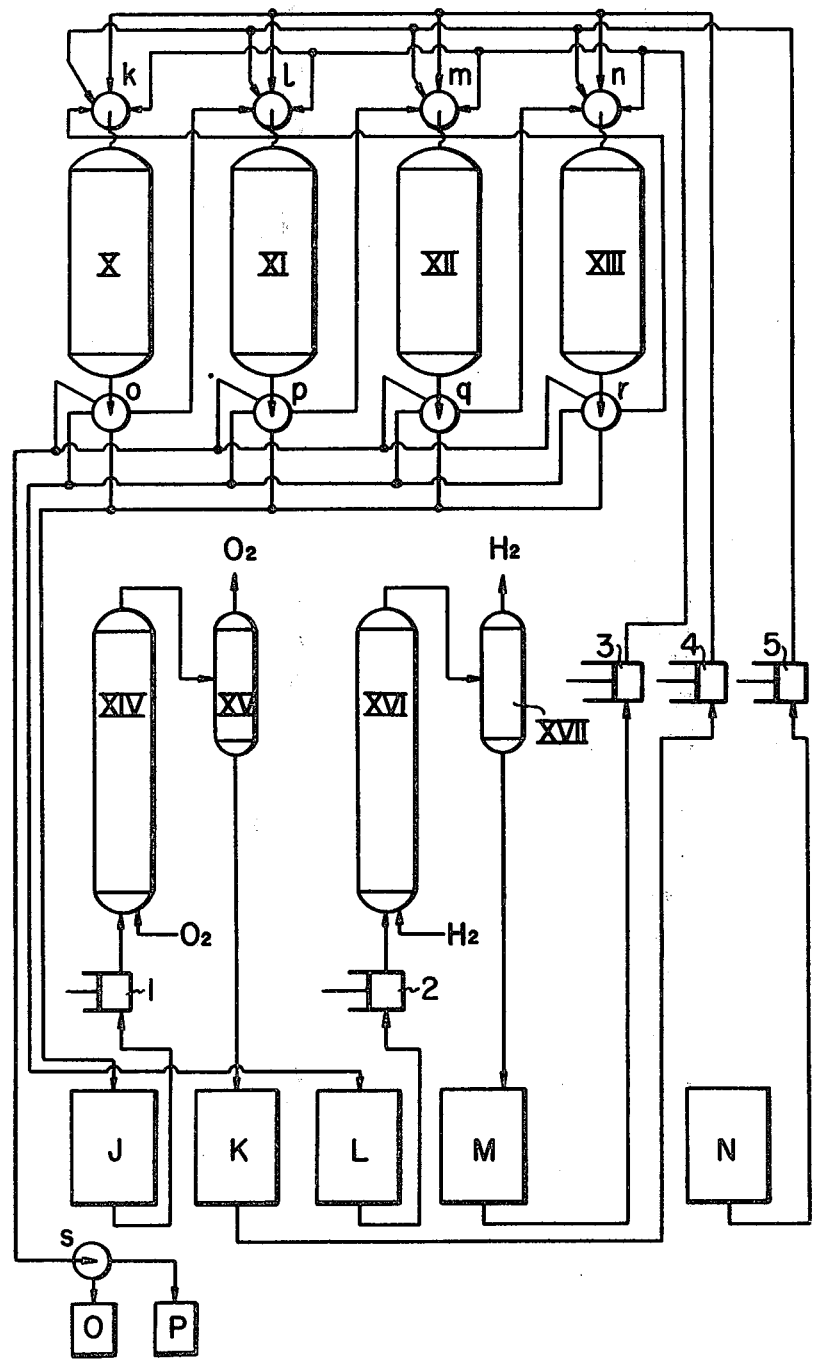
FIG. 3 illustrates the flow diagram of an apparatus of still another embodiment of this invention wherein four developing columns are employed.

FIG. 3 shows the apparatus employed in this Example. The developing means used included four columns X, XI, XII and XIII, each having a diameter of 20 mm and a length of 1,100 mm and equipped with a glass jacket. Each column was uniformly packed with a strongly basic anion exchange resin having an exchange capacity of 5.2 milliequivalent/g, a particle size of 200 to 300 mesh (about 45 to 75 microns), a number average particle size of 55 microns, about 82% of all of the resin particles having a particle diameter of ⅔ to 3/2 times the number average particle diameter and about 91% of all of the resin particles having a ratio of minimum diameter to maximum diameter of ½ to 1 up to a height of 1,000 mm. Electrically operable, four-way switch-over valves k, l, m, n, o, p, q and r, each was connected to the inlet and outlet of columns X, XI, XII and XIII, respectively. An oxidizing means included jacketed, pressure resistant column XIV having a diameter of 20 mm and a length of 500 mm and packed with glass Rashig rings in four stages and gas-liquid separator XV having a volume of 300 ml and connected to column XIV. The oxidation reaction was carried out by concurrently introducing oxygen gas and an eluant from the bottom of column XIV and contacting the eluant and the oxygen. A reducing means included jacketed, pressure-resistant column XVI having a diameter of 20 mm and a length of 500 mm and packed with a reducing catalyst in four stages and gas-liquid separator XVII having a volume of 300 ml and connected to column XVI. The reduction reaction was carried out by concurrently introducing hydrogen gas and an eluant from the bottom of column XVI and contacting the eluant and the hydrogen in the same manner as in the oxidation reaction. The catalyst employed was prepared by supporting 2% by weight of platinum metal on spherical carbon particles having a diameter of 3 mm as the carrier. Furthermore, the apparatus included five metering pumps 1, 2, 3, 4 and 5, each having a capacity of 0 to 10 ml per minute, with pumps 1 and 2 being pressure-resistant; five reservoirs for reaction solutions J, K, L, M and N, each having a volume of 10 l; and one two-way switch-over valve i for sampling uranium. The above-mentioned means were piped as shown in FIG. 3.

Six liters of a solution containing 0.3 M of trivalent iron ion, 0.2 M of trivalent vanadium ion, 0.35 M of tetravalent titanium ion and 4.8 M of hydrochloric acid was charged in reservoir K. Six liters of a solution containing 0.2 M of trivalent vanadium ion, 0.35 M of trivalent titanium ion and 4.8 M of hydrochloric acid was charged in reservoir M, and 2.5 l of a solution containing 0.15 M of tetravalent uranium ion, 0.2 M of trivalent vanadium ion and 4.8 M of hydrochloric acid was charged in reservoir N. The 0.2 M of trivalent vanadium ion in each of the solutions was employed as an electron exchange catalyst.

The start-up operation was carried out in the same manner as in the three developing column operation system in FIG. 2, and the length of an uranium adsorption zone in the stationary state was controlled to about 2 m. For example, if an uranium adsorption zone in the stationary state extended over columns X, XI and XII, the flow route of the solution as a whole, starting at reservoir M was route M-3-k-X-o-l-XI-p-m-XII-q-J-1-XIV-XV-K-4-n-XIII-r-L-2-XVI-XVII-M. The flow rate of the solution through the entire system was 9.53 ml per minute. In the oxidizing means the flow rate of oxygen gas and the height of the packed glass Rashig ring under a pressure of oxygen of 25 kg/cm² were prescribed in such a manner that the rate of oxidation of divalent iron ion to trivalent iron ion was 95.5%. Likewise, in the reducing means the flow rate of hydrogen gas and the height of the catalyst under a pressure of hydrogen of 38 kg/cm² were prescribed in such a manner that the rate of reduction of tetravalent titanium ion to trivalent titanium ion was at least 94.0%. The chromatographic development, regenerating oxidation and reduction reactions were carried out at 80° C.

A natural uranium solution as a starting solution was fed at a rate of 5.06 g per day to the central portion of the circulating uranium adsorption zone and almost at the same time the uranium separated was withdrawn from the front and rear portion of the uranium zone in an amount of about 2 g, respectively. From start-up, the operation was continued for 7 days to achieve a stationary state and thereafter the recovery of uranium separated and the supply of the starting uranium solution were performed every day. The isotopic ratio of the natural uranium was 0.007253. The results obtained are shown in Table 4.

Table 4

| Period of Operation time | Sampling Time | Isotopic Ratio in Front Region near Boundary (%) | Isotopic Ratio in Rear Region near Boundary (%) |
| --- | --- | --- | --- |
| Start | (10:00) | 0.7253 | |
| 7th Day | 12:05–13:45 | 0.6260 | 0.8244 |
| 8th Day | 12:15–13:35 | 0.6245 | 0.8262 |
| 9th Day | 12:08–13:48 | 0.6256 | 0.8235 |
| 10th Day | 12:04–13:44 | 0.6238 | 0.8268 |
| 11th Day | 12:12–13:52 | 0.6251 | 0.8259 |
| Average | | 0.6250 | 0.8254 |

Note: Isotopic ratio of uranium isotopes was measured with a sample collected in the sampling time.

EXAMPLE 2

Figure 4:
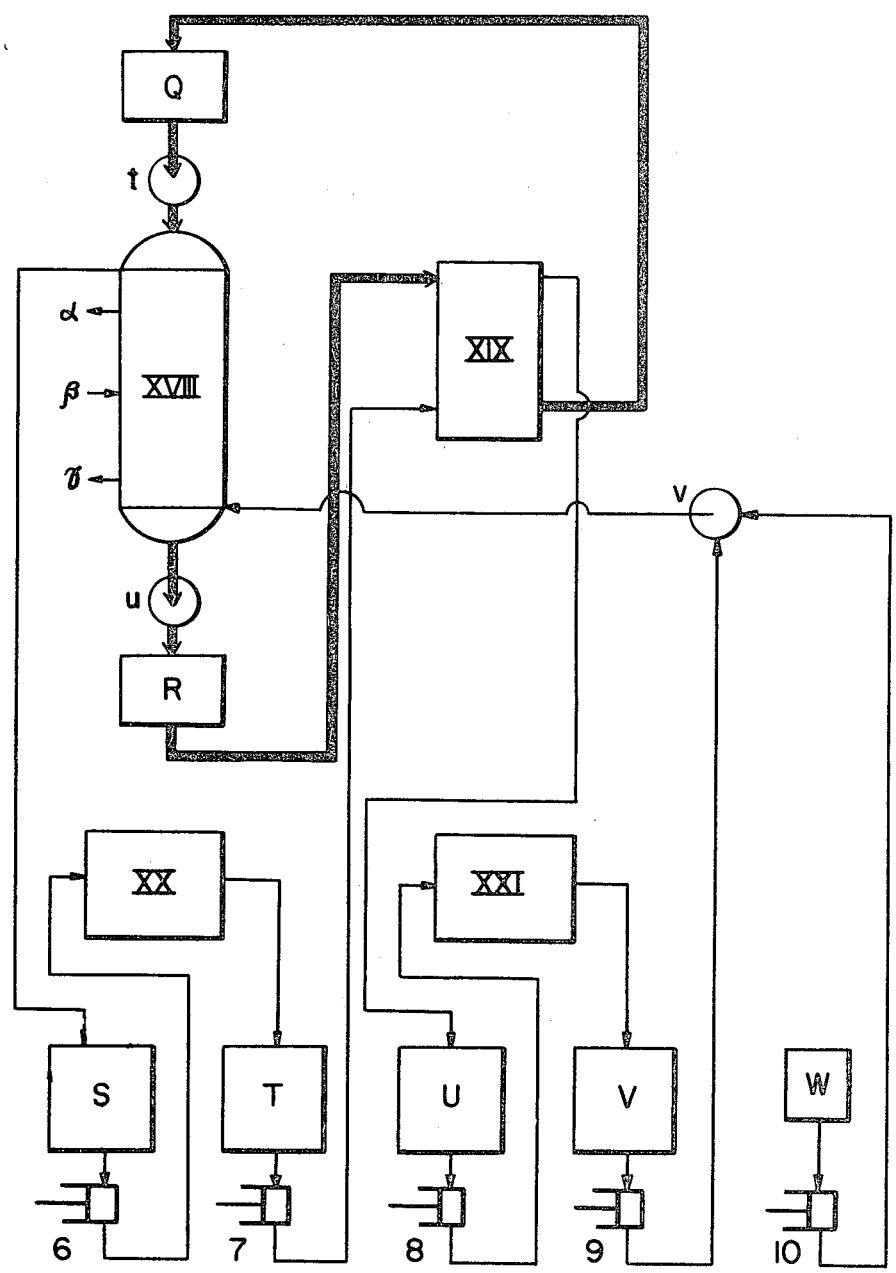
FIG. 4 illustrates the flow diagram of an apparatus of still further embodiment of this invention wherein one developing column is employed.

FIG. 4 shows the apparatus employed in this Example. The developing means used included developing column XVIII having a diameter of 30 mm and a length of 1,500 mm, equipped with a glass jacket and provided with nozzles $\alpha$ and $\gamma$ for withdrawing uranium separated; nozzle $\beta$ for supplying a natural uranium solution at the flank of developing column XVIII; reservoir Q having a volume of about 500 ml above developing column XVIII and connected thereto with rotary valve t having a concave portion and capable of discharging an anion exchanger at a constant rate; and reservoir R having the same volume as reservoir Q below developing column XVIII and connected thereto with rotary valve u having the same structure and function as rotary valve t. Apparatus XIX used had a structure similar to developing column XVIII and included a column having a diameter of 20 mm and a length of 800 mm, two reservoirs having a volume of about 300 ml corresponding to reservoirs Q and R, and two rotary valves having the same structure and function as rotary valves t and u which connected the two reservoirs to the column, respectively, in the same manner as in developing column XVIII. Oxidizing apparatus XX and reducing apparatus XXI employed were the same ones as in Example 1, i.e. oxidizing means including column XIV and separator XV and reducing means including column XVI and separator XVII in FIG. 3. The transfer of an anion exchanger was performed by a screw conveyer type transfer means. Furthermore, the apparatus included five metering pumps 6, 7, 8, 9 and 10, each having a capacity of 0 to 25 ml per minute, with pumps 6 and 8 being pressure-resistant; five reservoirs for reaction solutions S, T, U, V and W, each having a volume of 10 l; and one three-way switchover valve v.

The anion exchanger employed, solution compositions and conditions selected and operation temperature employed were the same as in Example 1.

The start-up operation and continuous operation were the same as explained referring to FIG. 4. In the continuous operation the flow of the solution starting at reservoir V was route V-9-v-XVIII-S-6-XX-T-7-XIX-U-8-XXI-V and the transfer route of the anion exchanger starting at developing column XVIII was route XVIII-u-R-XIX-Q-t-XVIII. At this time the uranium adsorption zone was at a standstill in developing column XVIII and the flow rate of the solution through the entire system was controlled to 20.8 ml per minute and the transfer rate of the anion exchanger through the entire system was controlled to 4.91 ml (wet) per minute. Also the length of the uranium adsorption zone was controlled to 1,200 mm in conformity with nozzles $\alpha$, $\beta$ and $\gamma$. In the oxidizing means the flow rate of oxygen gas and the height of the packed glass Rashing rings under a pressure of oxygen of 25 Kg/cm² were prescribed in such a manner that the rate of oxidation of divalent iron ion to trivalent iron ion was 95%. Likewise, in the reducing means the flow rate of hydrogen gas and the height of the catalyst under a pressure of hydrogen of 38 Kg/cm² were prescribed in such a manner that the rate of reduction of tetravalent titanium ion to trivalent titanium ion was 93%.

From start-up, the operation was continued for 6 days to achieve a stationary state and thereafter the recovery of uranium separated through nozzles $\alpha$ and $\gamma$ was continuously performed at a rate of 0.21 to 0.24 g per hour and the supply of a natural uranium solution through nozzle $\beta$ to the central portion of the uranium adsorption zone was continuously performed at a rate of 0.42 to 0.48 g. The isotopic ratio of the natural uranium was 0.007253. The results obtained are shown in Table 5.

Table 5

| Period of Operation time | Sampling Time | Isotopic Ratio in Front Region near Boundary (%) | Isotopic Ratio in Rear Region near Boundary (%) |
| --- | --- | --- | --- |
| Start | (12:00) | 0.7253 | |
| 6th Day | 12:00–13:00 | 0.6595 | 0.7915 |
| 7th Day | 11:00–12:00 | 0.6588 | 0.7911 |
| 8th Day | 13:00–14:00 | 0.6597 | 0.7905 |
| 9th Day | 12:00–13:00 | 0.6604 | 0.7918 |
| 10th Day | 11:00–12:00 | 0.6599 | 0.7903 |
| Average | | 0.6597 | 0.7910 |

Note: Isotopic ratio of uranium isotopes was measured with a sample collected in the sampling time.

While the invention has been described in detail and with reference to specific embodiments thereof, it will be apparent to one skilled in the art that various changes and modifications can be made therein without departing from the spirit and scope thereof.

What is claimed is:

1. In a process for continuously separating uranium isotopes by oxidation-reduction reaction in an acidic solution comprising forming a uranium adsorption zone on a body of anion exchanger, displacing the uranium adsorption zone through the body of anion exchanger by oxidation and reduction reactions of uranium with an oxidizing agent and a reducing agent in contact with the uranium adsorption zone, the improvement which comprises:

subjecting an eluant containing the deactivated oxidizing agent and the deactivated reducing agent as a mixture to an oxidation reaction to regenerate the deactivated oxidizing agent without affecting the the deactivated reducing agent, separating the regenerated oxidizing agent from the resulting eluant with the anion exchanger used for isotope separation, and reusing the regenerated oxidizing agent separated for the oxidation of uranium.

2. The process as claimed in claim 1, wherein the process includes reducing the deactivated reducing agent to regenerate the reducing agent after the separation of the regenerated oxidizing agent and reusing the regenerated reducing agent for the reduction of uranium.

3. The process as claimed in claim 1, wherein the oxidizing agent is at least one metal ion selected from the group consisting of trivalent thallium ion, hexavalent molybdenum ion, pentavalent antimony ion, divalent mercury ion, hexavalent chromium ion, trivalent iron ion and tetravalent cesium ion.

4. The process as claimed in claim 1, wherein the reducing agent is at least one metal ion selected from the group consisting of trivalent titanium ion, divalent vanadium ion, trivalent vanadium ion, trivalent niobium ion, divalent chromium ion and monovalent copper ion.

5. The process as claimed in claim 1, wherein the combination of the oxidizing agent and the reducing agent is trivalent iron ion and trivalent titanium ion.

6. The process as claimed in claim 1, wherein the combination of the oxidizing agent and the reducing agent is trivalent iron ion and divalent vanadium ion.

7. The process as claimed in claim 1, wherein the process includes oxidizing the mixed eluant containing the deactivated oxidizing agent and the deactivated reducing agent with oxygen.

8. The process as claimed in claim 2, wherein the process includes regenerating the deactivated reducing agent with hydrogen.

9. The process as claimed in claim 8, wherein the regeneration is carried out in the presence of a catalyst containing at least one metal selected from the group consisting of ruthenium, rhodium, palladium, osmium, iridium and platinum.

10. The process as claimed in claim 1, wherein the process comprises:

forming a uranium adsorption zone on a bed of anion exchanger in a developing column, displacing the uranium adsorption zone through the bed of anion exchanger by oxidation and reduction reactions of uranium with an oxidizing agent and a reducing agent in contact with the uranium adsorption zone, subjecting an eluant containing the deactivated oxidizing agent and the deactivated reducing agent as a mixture to an oxidation reaction to regenerate the deactivated oxidizing agent, separating the regenerated oxidizing agent from the resulting eluant with the anion exchanger used for isotope separation, and reusing the regenerated oxidizing agent separated for the oxidation of uranium.

11. The process as claimed in claim 10, wherein the process includes reducing the deactivated reducing agent to regenerate the reducing agent after the separation of the regenerated oxidizing agent and reusing the regenerated reducing agent for the reduction of uranium.

12. The process as claimed in claim 10, wherein the separation of uranium isotopes is continuously carried out by repeating a procedure using at least two developing columns packed with an anion exchanger which comprises:

forming a uranium adsorption zone in at least one developing column, displacing the uranium adsorption zone through the column, separating the regenerated oxidizing agent by adsorption from the deactivated reducing agent in at least one remaining developing column to form an oxidizing agent adsorption zone, and transferring the uranium adsorption zone after completion of the development of the resulting oxidizing zone for the oxidation of uranium.

13. The process as claimed in claim 12, wherein the process includes reducing the deactivated reducing agent to regenerate the reducing agent after the separation of the regenerated oxidizing agent and reusing the regenerated reducing agent for the reduction of uranium.

14. The process as claimed in claim 10, wherein the process comprises forming a uranium adsorption zone on a bed of anion exchanger moving through a developing column countercurrently to the flow of reducing agent and supplying the anion exchanger having the regenerated oxidizing agent adsorbed thereon to the developing column.

15. The process as claimed in claim 14, wherein the process includes reducing the deactivated reducing agent to regenerate the reducing agent after the separation of the regenerated oxidizing agent and reusing the regenerated reducing agent for the reduction of uranium.

* * * * *